United States Patent
Omori

(10) Patent No.: US 10,415,651 B2
(45) Date of Patent: Sep. 17, 2019

(54) DOG CLUTCH MECHANISM

(71) Applicant: HONDA MOTOR CO., LTD., Tokyo (JP)

(72) Inventor: Ikuo Omori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 66 days.

(21) Appl. No.: 15/559,581

(22) PCT Filed: Mar. 22, 2016

(86) PCT No.: PCT/JP2016/059046
§ 371 (c)(1),
(2) Date: Sep. 19, 2017

(87) PCT Pub. No.: WO2016/158581
PCT Pub. Date: Oct. 6, 2016

(65) Prior Publication Data
US 2018/0045252 A1    Feb. 15, 2018

(30) Foreign Application Priority Data

Apr. 1, 2015  (JP) ................ 2015-075476

(51) Int. Cl.
| | | |
|---|---|---|
| F16D 11/10 | (2006.01) | |
| F16D 23/06 | (2006.01) | |
| F16D 11/14 | (2006.01) | |
| F16D 11/00 | (2006.01) | |

(52) U.S. Cl.
CPC .............. F16D 11/10 (2013.01); F16D 11/14 (2013.01); F16D 23/06 (2013.01);
(Continued)

(58) Field of Classification Search
CPC ...... F16D 23/02; F16D 23/06; F16D 23/0618; F16D 23/0606; F16D 23/0612;
(Continued)

(56) References Cited

U.S. PATENT DOCUMENTS 2,394,098 A * 2/1946 Peterson ................ F16D 23/08
192/53.35
2,443,597 A * 6/1948 Carnagua ............... F16D 23/02
192/48.91
(Continued)

FOREIGN PATENT DOCUMENTS

| JP | 5-31685 B2 | 5/1993 |
|---|---|---|
| JP | 6-330960 A | 11/1994 |

(Continued)

OTHER PUBLICATIONS

International Search Report dated Jun. 28, 2016, issued in counterpart International Application No. PCT/JP2016/059046 (1 page).

*Primary Examiner* — Jacob S. Scott
*Assistant Examiner* — James J Taylor, II
(74) *Attorney, Agent, or Firm* — Westerman, Hattori, Daniels & Adrian, LLP

(57) ABSTRACT

Provided is a dog clutch mechanism that can guarantee a successful engaging operation regardless of relative rotational positions of a sleeve and a transmission gear, with a simple and inexpensive configuration. When sliding of a sleeve (20) toward a transmission gear (30) involves contact (abutting) between dog teeth (21*b*) of the sleeve (20) and key members (50), an engaged state is achieved so that a rotation shaft (2) and the transmission gear (30) integrally rotate, with the key members (50) retracted toward the transmission gear (30) to a retracted position against biasing force of a coil spring (55), and the dog teeth (21*b*) fit in keyway (51) between the plurality of key members (50). Thus, the dog clutch mechanism (1) guarantees the successful engagement with only a single engagement operation.

10 Claims, 14 Drawing Sheets

(52) U.S. Cl.
CPC .... *F16D 23/0606* (2013.01); *F16D 2011/006* (2013.01); *F16D 2023/0618* (2013.01)

(58) Field of Classification Search
CPC .. F16D 23/0625; F16D 23/0631; F16D 23/08; F16D 2023/0631; F16D 2023/0637; F16D 2023/0656
See application file for complete search history.

(56) References Cited

U.S. PATENT DOCUMENTS

| | | | | |
|---|---|---|---|---|
| 2,555,961 A | * | 6/1951 | Dunn | F16D 23/0606 192/53.3 |
| 2,573,613 A | * | 10/1951 | Schultze | F16D 23/0606 192/53.331 |
| 3,228,499 A | * | 1/1966 | Peras | F16D 23/025 192/53.35 |
| 4,823,631 A | * | 4/1989 | Kishimoto | F16D 23/06 192/53.32 |
| 4,875,566 A | * | 10/1989 | Inui | F16D 23/06 192/53.35 |
| 5,086,897 A | * | 2/1992 | Reynolds | F16D 23/0606 192/53.331 |
| 5,934,428 A | * | 8/1999 | Braun | F16D 23/0606 192/53.31 |
| 2009/0165582 A1 | | 7/2009 | Tsunashima et al. | |

FOREIGN PATENT DOCUMENTS

| | | |
|---|---|---|
| JP | 2009-156375 A | 7/2009 |
| JP | 2010-78119 A | 4/2010 |
| JP | 2014-234842 A | 12/2014 |

\* cited by examiner

A-A

X-X

B-B

C-C

DOG CLUTCH MECHANISM

TECHNICAL FIELD

The present invention relates to a dog clutch mechanism configured to integrally rotate a rotation shaft and a rotation member, with a slide member, such as a sleeve disposed on a rotation shaft to be slidable in an axial direction, slid toward an adjacent rotation member such as a gear so that dog teeth of the slide member engage with the rotation member side.

BACKGROUND ART

Transmissions, particularly, multistage transmissions including a plurality of pairs of transmission gears, installed in vehicles, employ the following configuration. Specifically, a speed change operation is performed with a sleeve, mounted on a main shaft and a counter shaft to be slidable in an axial direction, driven by a shift fork to fit with the transmission gear. For example, Patent document 1 discloses a dog clutch mechanism achieving the fitting between the sleeve and the transmission gear, through fitting between dog teeth provided to the sleeve and dog holes provided to the transmission gear. The dog clutch mechanism may further include a synchromesh mechanism to be a synchromesh-dog clutch mechanism. The dog clutch mechanism is provided in a manual transmission with the sleeve, for switching the speed change stage, manually slid. The dog clutch mechanism is also provided in an automatic transmission including an actuator mechanism that makes the sleeve automatically slide with a hydraulic actuator.

The dog clutch mechanism described above might involve contact between distal ends of the dog teeth of the sleeve, slid toward the transmission gear, and distal ends of the dog teeth of the transmission gear, leading to insufficient meshing between the dog teeth, resulting in engagement failure of the dog clutch mechanism. In this case, the engaging operation needs to be reattempted with the sleeve retracted. Thus, the manual transmission involves potential cumbersomeness that the speed change operation may need to be repeatedly attempted. In the same situation, the automatic transmission including the actuator mechanism described above reattempts (retries) the speed change operation after a detection means such as a sensor detects the engagement failure of the dog clutch mechanism. As a result, the speed change operation is delayed or hindered in other ways, and thus might not be smoothly conducted. All things considered, a driver of a vehicle including the transmission might feel irritated through a driving operation.

The contact between the dog teeth might result in small broken pieces breaking off from the dog teeth. The small broken pieces might be caught in hydraulic equipment such as a valve mechanism and a pump of the transmission, to disable the normal operation of these components. Furthermore, the small broken pieces might also be caught in a bearing, rendering a service life of the bearing shorter.

The conventional dog clutch mechanisms have been unable to completely eliminate the risk of the shifting failure due to the contact between the distal ends of the dog teeth. Thus, the transmission including the conventional dog clutch mechanism requires the speed change operation to be reattempted when the engagement failure of the dog clutch mechanism occurs.

Patent document 1 discloses a technique of detecting a meshed state of a dog clutch based on a difference between inner and outer main shafts in rotational speed, and an output signal from the gear position sensor. This configuration can accurately detect the engagement failure of the dog clutch, for reattempting the engaging operation (speed change operation). However, this does not offer a solution that can eliminate the need for reattempting the engaging operation of the dog clutch that hinders the smooth speed change operation.

Patent document 2 discloses a configuration for overcoming the task of the dog clutch for twin clutch transmission, that is, the failure to achieve the smooth fitting due to the contact between the distal ends of the dog teeth. Specifically, hydraulic control is employed to guarantee the fitting of the dog clutch for first speed and second speed. However, the conventional technology described in Patent Document 2 requires a hydraulic actuation device that needs control involving complexity and a certain amount of time.

As described above, various configurations for overcoming the disadvantages related to the contact between the dog teeth in the dog clutch mechanism have been proposed. Still, further technical improvement is expected to achieve a simple and inexpensive configuration ensuring a successful engaging operation of the dog clutch mechanism regardless of the relative rotational positions of the sleeve (slide member) and the gear (rotation member).

RELATED ART DOCUMENTS

Patent Documents

Patent document 1: Japanese Unexamined Patent Application Publication No. 2009-156375
Patent document 2: Japanese Unexamined Patent Application Publication No. 2010-078119

DISCLOSURE OF THE INVENTION

The present invention has been made in view of the foregoing points, and aims at guaranteeing a successful engaging operation regardless of relative rotational positions of a slide member and a rotation member, with a simple and inexpensive configuration.

Means of Solving the Problems

A dog clutch mechanism according to the present invention includes a rotation shaft (2), a slide member (20) attached on the rotation shaft (2) to be relatively unrotatable and slidable in an axial direction, a rotation member (30) disposed adjacent to the slide member (20) in the axial direction and coaxially disposed on the rotation shaft (2) to be relatively rotatable, dog teeth (21b) provided on an end portion of the slide member (20), on side closer to the rotation member (30) in the axial direction, a plurality of spline grooves (31) formed on the rotation member (30) and extending in the axial direction, a plurality of key members (50) each provided to the rotation member (30) to be relatively moveable in the axial direction and inserted in a corresponding one of the plurality of spline grooves (31), a plurality of gaps (51) formed as gaps in a circumference direction among the plurality of key members (50), and biasing means (55) that biases the plurality of key members (50) toward the slide member (20) in the axial direction. When sliding of the slide member (20) toward the rotation member (30) involves contact between the dog teeth (21b) and the key members (50), an engaged state is achieved so that the rotation shaft (2) and the rotation member (30) integrally rotate, with the key members (50) retracted toward the rotation member (30) to a retracted position against biasing force of the biasing means (55), and the dog teeth (21b) fit in the gaps (51).

In the dog clutch mechanism according to the present invention, when the sliding of the slide member toward the rotation member involves contact (abutting) between the dog teeth and the key members, the dog teeth engage (fit) with the gaps (dog holes) with the key members retracted to the retracted position against the biasing force of the biasing means. Thus, the dog clutch mechanism has no engagement failures regardless of the relative positions (relative rotational positions) of the sleeve and the transmission gear in the circumference direction. Thus, the dog clutch mechanism guarantees successful engagement with a single engagement operation only, and thus requires no repetitive engagement operations. This ensures switching between speed change stages to be achieved through a rapid and smooth operation in the transmission including the dog clutch mechanism. The e vehicle with the transmission can offer smooth acceleration/deceleration traveling, with driving operations not irritating the driver of the vehicle.

The contact between the dog tooth of the slide member and the key member results in the retraction of the key member that has come into contact with the dog tooth to the retracted position, and thus the contact involves no heavy impact on the distal end of the dog tooth. This largely reduces the risk of damage on the distal end of the dog tooth such as chipping and wearing, and thus largely reduces the risk of secondary failures due to broken pieces and dust as a result of waring caught in other devices and mechanisms including valves, pumps, and bearing.

The above-described dog clutch mechanism may further include a recess portion (32) formed in an end surface (30b) of the rotation member (30), on side closer to the slide member (20), and a plurality of spline projections (33, 36) each formed between corresponding adjacent ones of the plurality of spline grooves (31) in the circumference direction in the recess portion (32), and extending in the axial direction, in which the spline projections (33, 36) may include a plurality of outer spline projections (33) and a plurality of inner spline projections (36) respectively formed on radially outer and inner sides in the recess portion (32), and the key members (50) may each be inserted in a corresponding one of outer spline grooves (31), each formed between corresponding adjacent ones of the plurality of outer spline projections (33), and a corresponding one of inner spline grooves (37), each formed between corresponding adjacent ones of the plurality of inner spline projections (36).

With this configuration, the key member is inserted in the outer spline groove and in the inner spline groove, and thus has both ends in radially inner and outer side supported. This ensures a stable operation of the key member, and a smoother and more reliable engaging operation of the dog clutch mechanism. The configuration with the key member inserted in the outer spline groove and in the inner spline groove also ensures strength required for the key member.

In the above-described dog clutch mechanism, the biasing means (55) may include: a holder member (61-1,61-2) that extends in the circumference direction and is attached to the plurality of key members (50-1, 50-2), and one or a plurality of coil springs (55-1, 55-2) that bias the holder member (61-1,61-2).

This configuration including the holder member attached to the plurality of key members ensures the biasing force of the coil spring to be evenly applied over the plurality of key members. This ensures smooth and reliable operations of the key members between the initial position and the retracted position. The coil spring applying biasing force for the key member to return to the initial position is integrated with the holder member. This facilitates an attempt to simplify an assembling process for the dog clutch mechanism and the transmission.

In this case, the holder member may include: a first holder member (61-1) attached to alternating ones of the key members (50-1) in the circumference direction, and a second holder member (61-2) attached to remaining ones of the key members (50-2) in the circumference direction, and the coil springs (55) may at least include: a first coil spring (55-1) that biases the first holder member (61-1), and a second coil spring (55-2) that biases the second holder member (61-2).

With this configuration, each of the key members adjacent to each other is retractable through the same operation, regardless of which one of the key members comes into contact with the dog tooth of the slide member. This ensures a smoother engaging operation of the dog clutch mechanism.

According to one embodiment of the dog clutch mechanism in the present invention, the slide member (20) may be a sleeve (20) having an annular shape provided around the rotation shaft (2), and the rotation member (30) may be a gear (30) with an outer circumference provided with a teeth row (30c). The above drawing reference numerals put in brackets are ones which illustrate corresponding components or the like in embodiments described later, for the purpose of reference.

Effects of the Invention

The present invention can provide a dog clutch mechanism guaranteeing a successful engaging operation with a simple and inexpensive configuration.

MODES FOR CARRYING OUT THE INVENTION

Embodiments of the present invention are described in detail below with reference to the accompanying drawings.

First Embodiment

Figure 1:
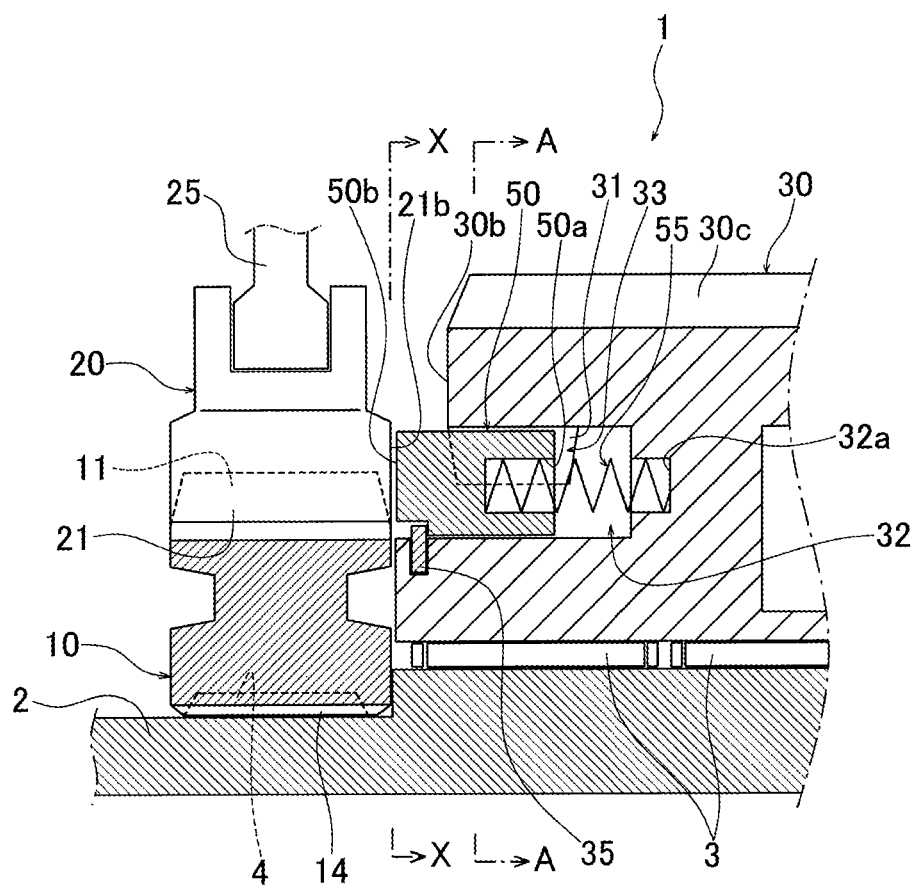
FIG. 1 is a schematic side sectional view of a dog clutch mechanism according to a first embodiment of the present invention.
Figure 2:
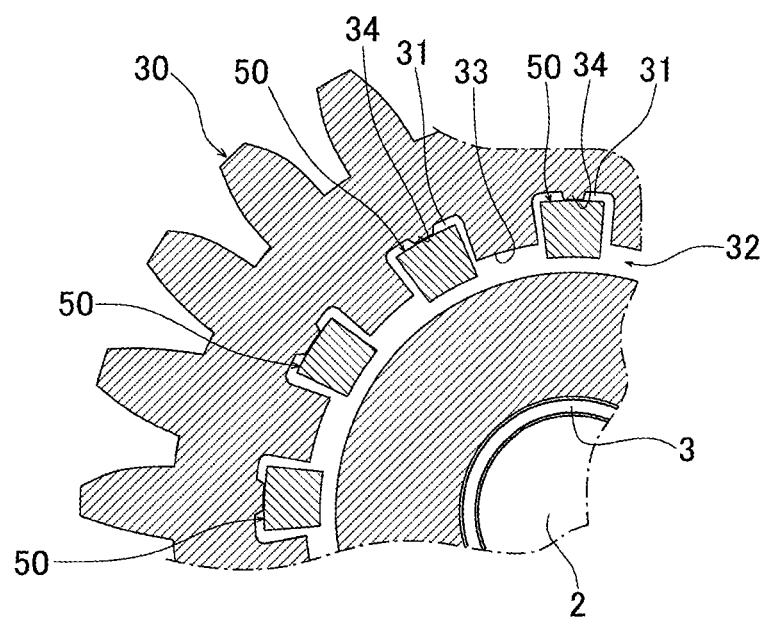
FIG. 2 is a schematic side sectional view of a portion indicated by arrows A-A in FIG. 1.

FIG. 1 is a schematic side sectional view of a dog clutch mechanism 1 according to a first embodiment of the present invention. FIG. 2 is a schematic side sectional view of a portion indicated by arrows A-A in FIG. 1. The dog clutch mechanism 1 illustrated in these drawings is for a predetermined speed change stage of a transmission of a vehicle, and includes: a rotation shaft 2; a transmission gear (gear) 30 rotatably supported on the rotation shaft 2; a hub 10 that is secured on the rotation shaft 2 and integrally rotates with the rotation shaft 2; a sleeve (slide member) 20 that is attached to the hub 10 upon being driven by a shift fork 25 in such a manner as to be unrotatable relative to the hub 10 and to be slidable in an axial direction; and a plurality of key members 50 that fit in a plurality of outer spline grooves 31 formed in the transmission gear 30. The axial direction as used in the description below represents the axial direction of the rotation shaft 2.

The transmission gear 30 is rotatably supported on the rotation shaft 2 via a needle bearing 3. The transmission gear 30 has an outer circumference provided with a teeth row 30c including a plurality of teeth that mesh with another transmission gear (not shown). The hub 10 is secured on the rotation shaft 2 in such a manner as to integrally rotate with the rotation shaft 2, when a spline 14 formed on an inner circumference surface of the hub 10 engages with a spline 4 formed on an outer circumference surface of the rotation shaft 2. The hub 10 has an outer circumference surface provided with a spline tooth (hub spline) 11 and the sleeve 20 has an inner circumference surface provided with a spline tooth (sleeve spline) 21 that meshes with the hub spline 11. The hub spline 11 and the sleeve spline 21 each include a plurality of projections and grooves extending in the axial direction while being alternately arranged in a circumference direction. The sleeve 20 is attached to the hub 10 to be relatively unrotatable and to be slidable in the axial direction, with the hub spline 11 and the sleeve spline 21 in mesh with each other. The sleeve spline 21 has an end portion, on the side closer to the transmission gear 30 (key member 50) in the axial direction, serving as dog teeth 21b that mesh with the transmission gear 30 side.

The transmission gear 30 has an end surface 30b, on the side closer to the sleeve 20 in the axial direction, provided with a recess portion 32. The recess portion 32 includes: a plurality of outer spline projections (spline projections) 33 extending toward the inner side of the transmission gear 30 (right side in the figure) from the end surface 30b in the axial direction; and a plurality of outer spline grooves (spline grooves) 31 formed between the plurality of outer spline projections 33 in the circumference direction. As illustrated in FIG. 2, the outer spline projections 33 protrude in a radial direction from the outer circumference surface toward the inner circumference side in the recess portion 32. The outer spline grooves 31 are recessed toward the outer circumference side from the outer circumference surface in the recess portion 32. The outer spline projections 33 and the outer spline grooves 31 are a plurality of projections and grooves formed at an equal interval along the circumference direction.

Each of the plurality of key members 50, inserted in a corresponding one of the plurality of outer spline grooves 31, is movable (slidable) relative to the transmission gear 30 in the axial direction. The plurality of key members 50 are arranged with gaps in between in the circumference direction. The gaps serve as a plurality of keyways (gaps) 51 (see FIG. 3 and FIG. 5) that receive the dog teeth 21b of the sleeve 20 that has slid toward the transmission gear 30. The dog tooth 21b has a flat distal end surface in the axial direction and the key member 50 has a flat base end surface in the axial direction.

As illustrated in FIG. 2, the key members 50 each have a larger width (a circumference direction width) on a radially outer side than on a radially inner side, and thus has an approximately sector shaped cross-sectional shape, as viewed in the axial direction. The key members 50 are each contained in a corresponding one of the outer spline grooves 31 while being separated from the adjacent outer spline projections 33 on both sides in the circumference direction by a slight clearance. The key members 50 each have an end surface, on the radially outer side, in contact with a small projection 34 formed on a bottom part (bottom surface on the radially outer side) of the outer spline groove 31 to slightly protrude inward in the radial direction. The small projection 34 extends in the axial direction on the bottom part of the outer spline groove 31. This ensures a smooth sliding operation of the key member 50, in the axial direction, in the outer spline groove 31.

As illustrated in FIG. 1, the plurality of key members 50 are each biased by a coil spring (biasing means) 55. The coil spring 55 has one end in a longitudinal direction held in a holding hole (spring holding hole) 50a provided on the end surface of the key member 50 on the side closer to the transmission gear 30, and has the other end held in a socket (spring socket) 32a formed in an end surface (bottom surface) of the recess portion 32 in the axial direction. The coil spring 55 thus arranged biases the key member 50 toward the sleeve 20 along the axial direction. The key member 50 biased by the coil spring 55 is stopped by a snap ring (engaging tool) 35. Thus, the key member 50 not in contact with the dog tooth 21b of the sleeve 20 is biased toward the sleeve 20 by the coil spring 55 and is stopped by the snap ring 35 at the left end position (hereinafter, referred to as an "initial position"). The key member 50 pressed by the dog tooth 21b of the sleeve 20 toward the right side in the axial direction retracts to a position (hereinafter, referred to as a "retracted position") on an inner side (right side in the axial direction) of the outer spring groove 31 (recess portion 32) against biasing force of the coil spring 55.

The depth dimensions of the holding hole 50a of the key member 50 and the socket 32a of the gear 30 and the length dimension in the coil spring 55 are set in such a manner that the coil spring 55 can apply biasing force to press the key member 50 in the initial position against the snap ring 35, and that the coil spring 55 can be in a fully compressed state, with the key member 50 is at the retracted position, without involving contact between portions of the wire of the coil spring 55.

Figure 3:
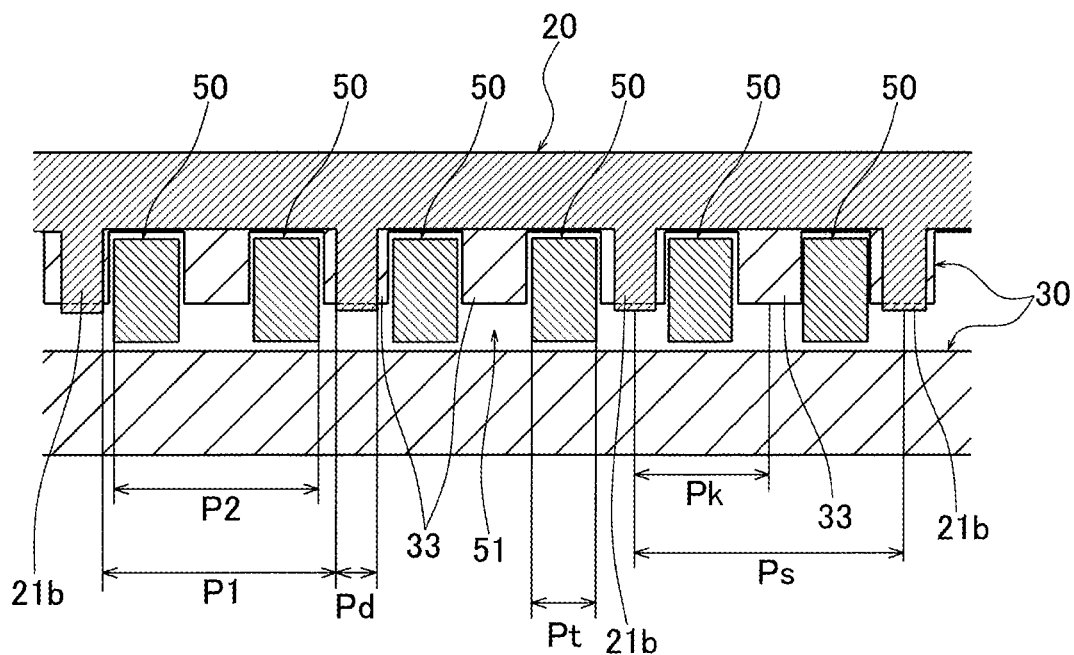
FIG. 3 is a schematic side sectional view of a portion indicated by arrows X-X in FIG. 1 linearly developed.

FIG. 3 is a schematic side sectional view of a portion indicated by arrows X-X in FIG. 1 linearly developed along the circumference direction. Pitches and widths as used in the description below represent angular pitches and width on a circumference with the same diameter. As illustrated in the drawing, the dog teeth 21b are arranged at a circumference direction pitch Ps set to be twice as large as a circumference direction pitch Pk between the outer spline projections 33. The dog teeth 21b each have a width Pd that is slightly smaller than a width Pt of each of the outer spline projections 33 of the transmission gear 30. Thus, a distance P1 between inner surfaces of adjacent ones of the dog teeth 21b of the sleeve 20 facing each other is slightly larger than a distance P2 between inner surfaces of two outer ones of every three outer spline projections 33 of the transmission gear 30 facing each other. Thus, the sleeve 20 of the dog clutch mechanism 1 meshes (engages) with the transmission gear 30 with the two adjacent key members 50 disposed (sandwiched) within the distance P1.

Figure 4:
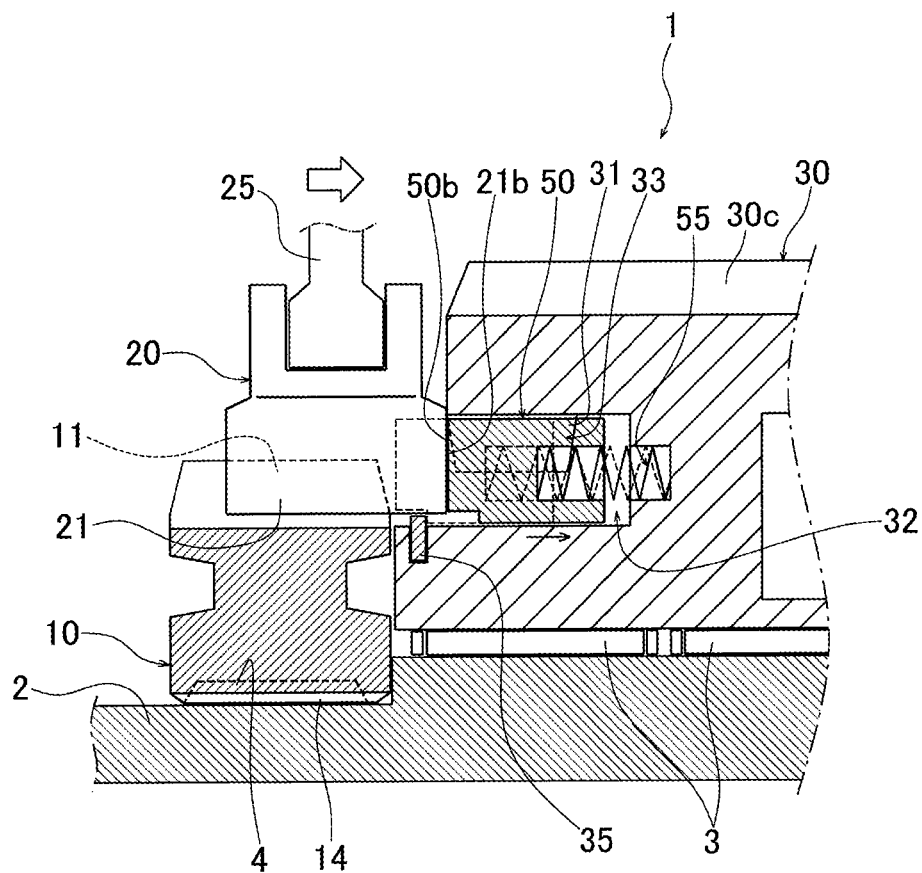
FIG. 4 is a diagram illustrating an operation of the dog clutch mechanism.
Figure 5:
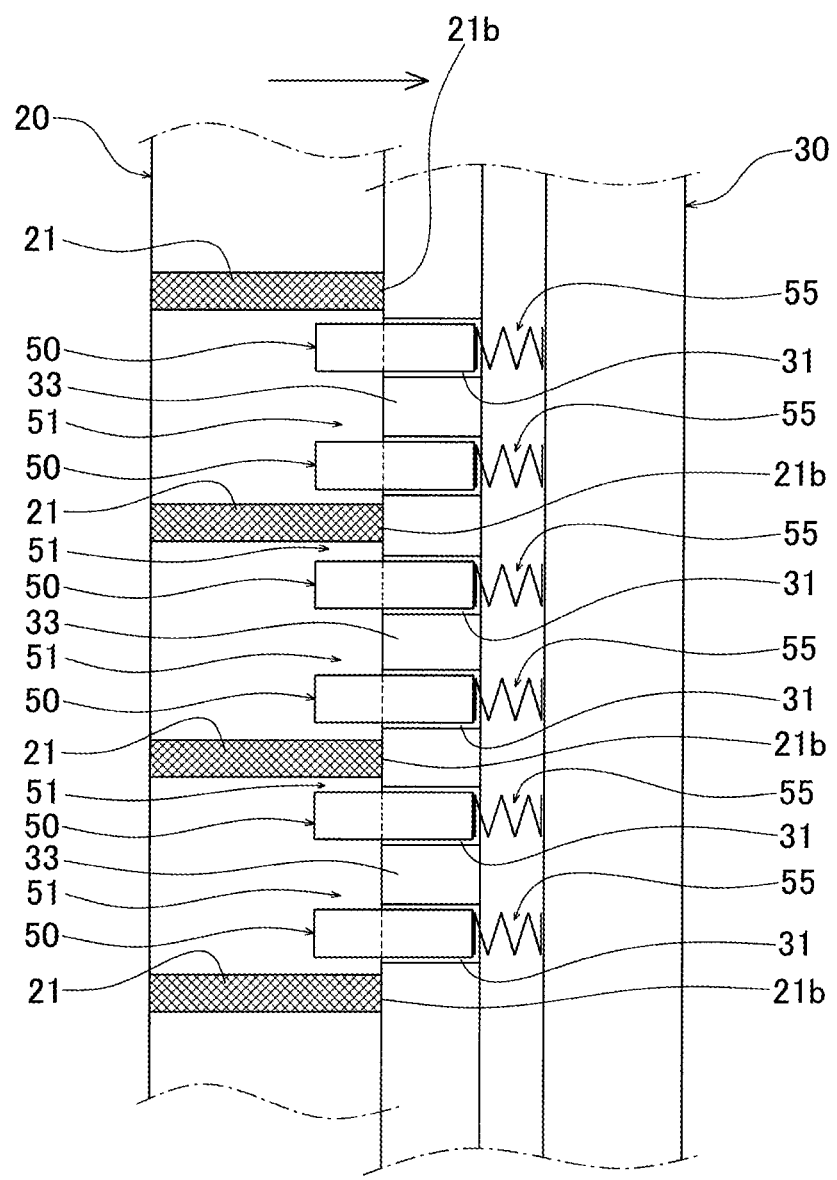
FIG. 5 is a schematic view of dog teeth, key members, and a transmission gear linearly developed along a circumference direction, illustrating an operation in a case where the dog teeth do not come into contact with the key members.
Figure 6:
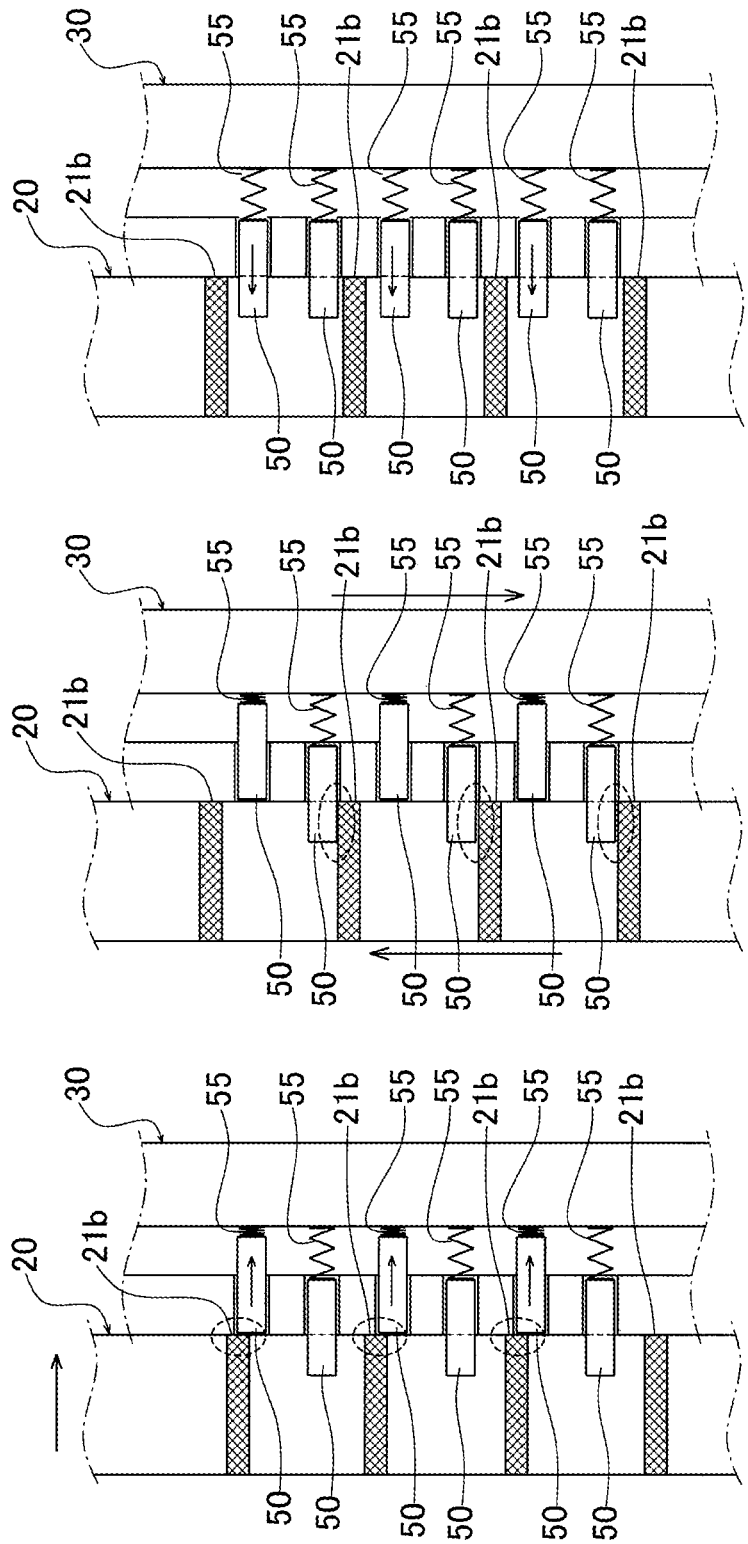
FIGS. 6A through 6C each is a schematic view of the dog teeth, the key members, and the transmission gear linearly developed along the circumference direction, illustrating an operation in a case where the dog teeth come into contact with the key members.

Next, an operation of the dog clutch mechanism 1 having the configuration described above is described. FIG. 4 is a diagram illustrating an operation of the dog clutch mechanism 1. FIG. 5 and FIGS. 6A through 6C are schematic views illustrating the sleeve 20 (dog tooth 21b), the key member 50, and the transmission gear 30 linearly developed along the circumference direction. FIG. 5 is a diagram illustrating an operation performed when the dog tooth 21b of the sleeve 20 does not come into contact with the key member 50. FIGS. 6A through 6C eachFlG. 6 is a diagram illustrating an operation performed when the dog teeth 21b of the sleeve 20 come into contact with the key member 50.

When the sleeve 20 slides toward the transmission gear 30 with no contact between the dog tooth 21b of the sleeve 20 and the key member 50, as illustrated in FIG. 5, the sleeve 20 engages with the transmission gear 30 (keyways 51), with two key members 50 disposed between each adjacent ones of the dog teeth 21b. Thus, an engaging operation of the dog clutch mechanism 1 is completed, with the transmission gear 30 and the sleeve 20 being unrotatable relative to each other. In this manner, the sleeve 20 smoothly engages with the transmission gear 30 when the dog teeth 21b of the sleeve 20 do not come into contact with the key members 50.

When the sliding of the sleeve 20 toward the transmission gear 30 involves the contact between the dog teeth 21b of the sleeve 20 and the key members 50, as illustrated in FIG. 4 and FIG. 6A, the key member 50 that has come into contact with the dog tooth 21b retracts to the retracted position with the coil spring 55 compressed by pressing force applied by the dog tooth 21b. The other key members 50 adjacent to the retracted key member 50 in the circumference direction do not come into contact with the dog tooth 21b, and thus stay at the initial position. Thus, the key members 50 at the initial position and the dog teeth 21b of the sleeve 20 mesh while being overlapped with each other with a slight gap (rattling) in between in the circumference direction.

After the contact between the dog teeth 21b of the sleeve 20 and the key member 50, the relative rotation between the transmission gear 30 and the hub 10 and the sleeve 20 is maintained or these components relatively rotate due to acceleration or deceleration. As illustrated in FIG. 6B, the relative rotation between the transmission gear 30 and the hub 10 and the sleeve 20 stops when a side surface (a side surface in the axial direction) of the dog tooth 21b comes into contact with a side surface of the key member 50. Until the relative rotation between the transmission gear 30 and the hub 10 and the sleeve 20 thus stops, the key member 50 at the retracted position laterally shifts (in the circumference direction) from the position to be in contact with the dog tooth 21b of the sleeve 20. Thus, as illustrated in FIG. 6C the key member 50 returns to the initial position from the retracted position, due to the biasing force of the coil spring 55.

As a result, the dog teeth 21b of the sleeve 20 each engage with the keyway 51 between two key members 50 adjacent to each other in the circumference direction. Thus, the engaging operation of the dog clutch mechanism 1 is completed, with the transmission gear 30 and the sleeve 20 being unrotatable relative to each other.

As described above, when the sliding of the sleeve 20 in the axial direction involves the contact between the dog teeth 21b of the sleeve 20 and the key members 50, the key member 50 that has come into contact with the dog tooth 21b is pressed to be at the retracted position from the initial position. In this process, other key members 50 adjacent to the retracted key member 50 in the circumference direction do not come into contact with the dog teeth 21b of the sleeve 20, and thus stay at the initial position. Thus, the dog teeth 21b of the sleeve 20 and the key members 50 at the initial position on both sides of the dog tooth 21b overlap with each other in the circumference direction to be in the engaged state. Thus, the transmission gear 30 and the sleeve 20 become relatively unrotatable with each other.

In the dog clutch mechanism 1 according to the present embodiment with the configuration described above, when the sliding of the sleeve 20 toward the transmission gear 30 involves the contact (abutting) between the dog teeth 21b and the key members 50, the dog teeth 21b engage (fit) with the keyways 51, with the key member 50 that has come into contact with the dog tooth 21b retracted to the retracted position against the biasing force of the coil spring 55. Thus, the dog clutch mechanism 1 has no engagement failures regardless of the relative positions (relative rotational positions) of the sleeve 20 and the transmission gear 30 in the circumference direction. Thus, the dog clutch mechanism 1 guarantees the successful engagement with a single engagement operation only, and thus requires no repetitive engagement operations. This ensures switching between speed change stages to be achieved through a rapid and smooth operation in the transmission including the dog clutch mechanism 1. All things considered, the vehicle with the transmission including the dog clutch mechanism 1 can offer smooth acceleration/deceleration traveling, with driving operations not irritating the driver of the vehicle.

The contact between the dog tooth 21b of the sleeve 20 and the key member 50 results in the retraction of the key member 50 that has come into contact with the dog tooth 21b to the retracted position, and thus the contact involves no heavy impact on the distal end of the dog tooth 21b. This largely reduces the risk of damage on the distal end of the dog tooth 21b such as chipping and wearing, and thus largely reduces the risk of secondary failures due to broken pieces and dust as a result of waring caught in other devices and mechanisms including valves, pumps, and bearing.

Second Embodiment

Next, a second embodiment of the present invention is described. In the description and the drawings corresponding to a second embodiment, components that are the same as or similar to the counterparts in the first embodiment are denoted with the same reference signs, and will not be described in detail below. Matters not described below are the same as those in the first embodiment, and this applies to the other embodiments.

Figure 7:
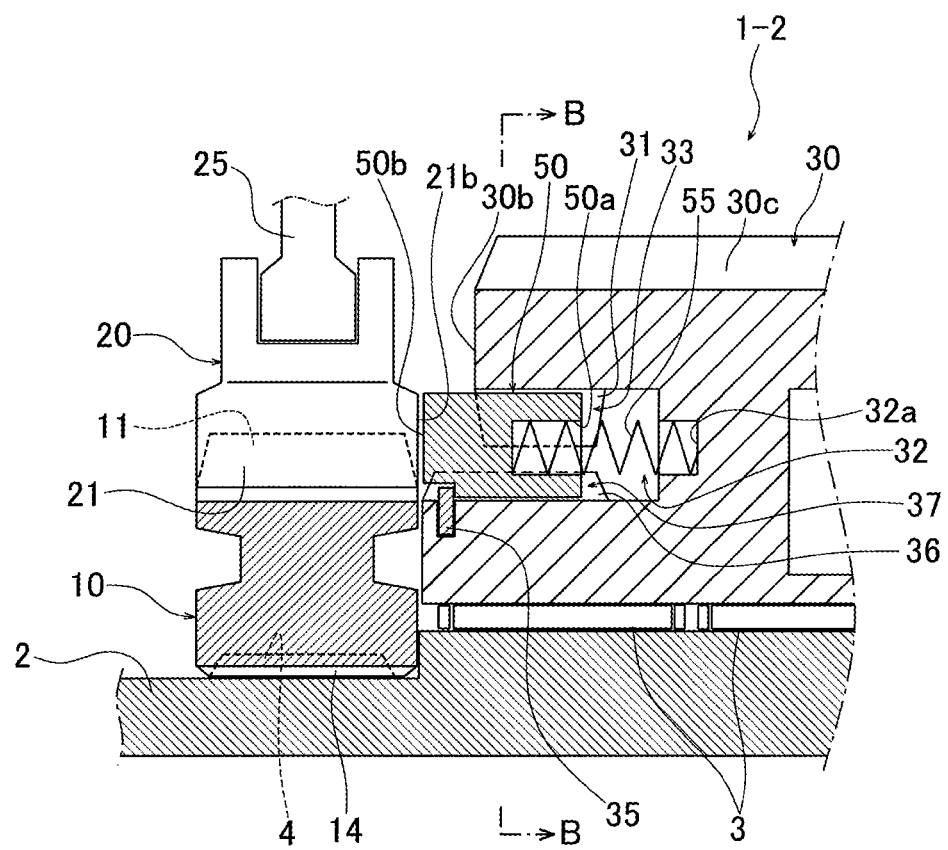
FIG. 7 is a schematic side sectional view of a dog clutch mechanism according to a second embodiment of the present invention.
Figure 8:
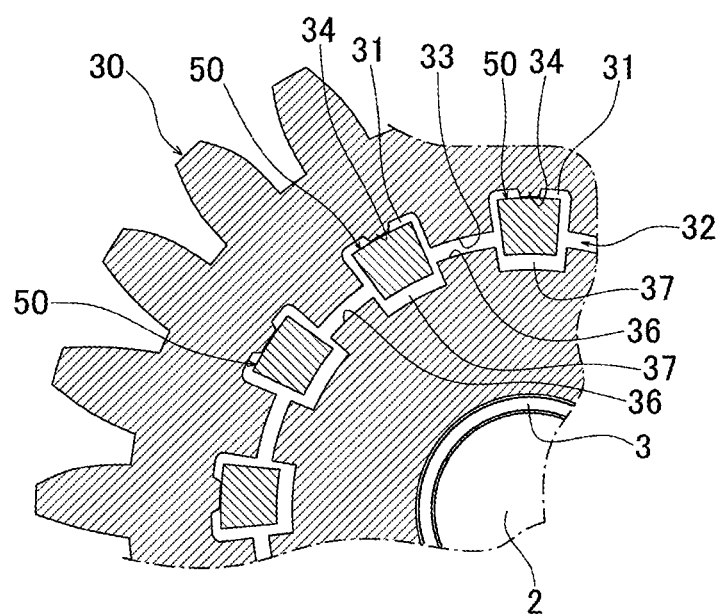
FIG. 8 is a schematic side sectional view of a portion indicated by arrows B-B in FIG. 7.

FIG. 7 is a schematic side sectional view of a dog clutch mechanism 1-2 according to a second embodiment of the present invention. FIG. 8 is a schematic side sectional view of a portion indicated by arrows B-B in FIG. 7. The dog clutch mechanism 1-2 according to the present embodiment includes an inner spline projection 36 in addition to the outer spline projection 33 formed in the recess portion 32 of the transmission gear 30. The inner spline projections 36 are formed on the inner circumference surface of the recess portions 32 with the same angle and pitch as the outer spline projections 33. The key members 50 are each inserted in both a corresponding one of the outer spline grooves 31, formed among the plurality of outer spline projections 33, and a corresponding one of inner spline grooves 37, formed among the plurality of inner spline projections 36. More specifically, the key member 50 has outer and inner ends in the radial direction respectively inserted in the outer spline groove 31 and the inner spline groove 37.

The dog clutch mechanism 1-2 according to the present embodiment has the key members 50 inserted in the outer spline grooves 31 and the inner spline grooves 37, to have both the inner and the outer ends in the radial direction supported. This ensures a stable operation of the key member 50, and thus ensures a smoother and more reliable engaging operation of the dog clutch mechanism 1. The configuration featuring the key members 50 inserted in the outer spline grooves 31 and the inner spline grooves 37 also ensures strength required for the key member 50.

Third Embodiment

Figure 9:
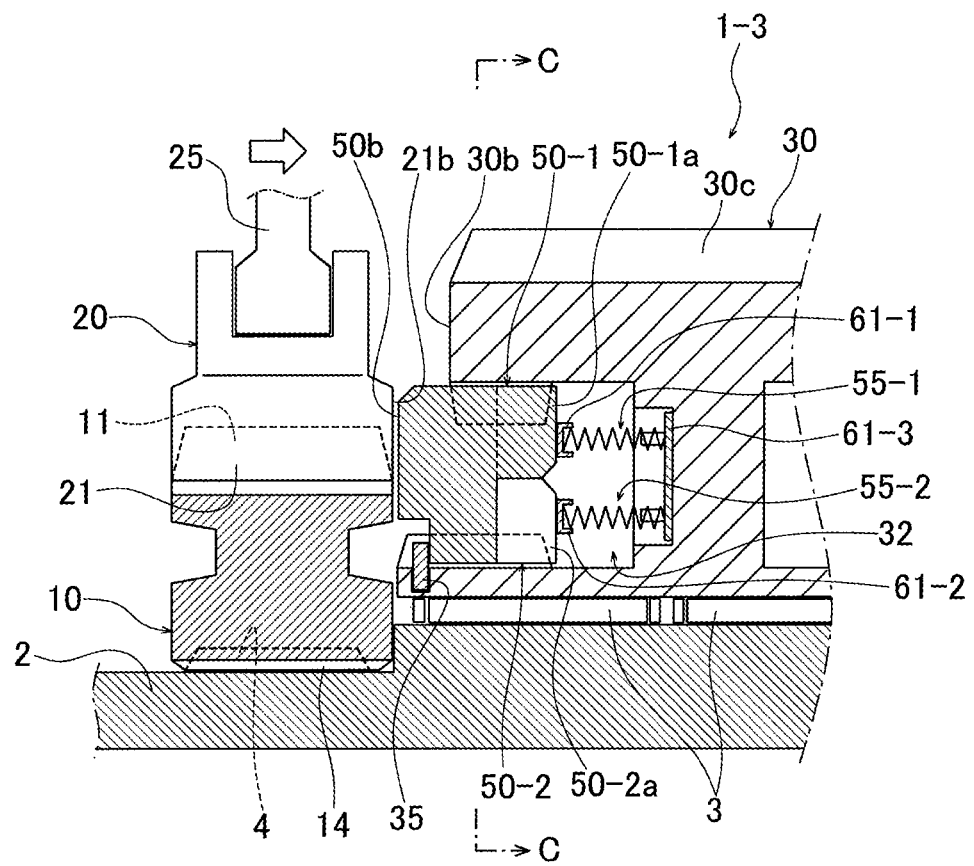
FIG. 9 is a schematic side sectional view of a dog clutch mechanism according to a third embodiment of the present invention.
Figure 10:
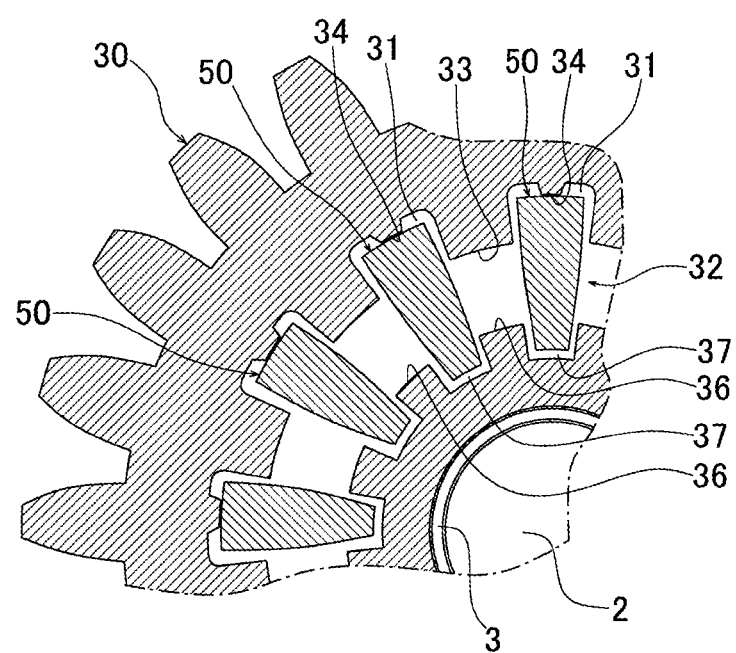
FIG. 10 is a schematic side sectional view of a portion indicated by arrows C-C in FIG. 9

Next, a third embodiment of the present invention is described. FIG. 9 is a schematic side sectional view illustrating a dog clutch mechanism 1-3 according to the third embodiment of the present invention. FIG. 10 is a schematic side sectional view illustrating a portion corresponding to arrows C-C in FIG. 9.

Figure 11:
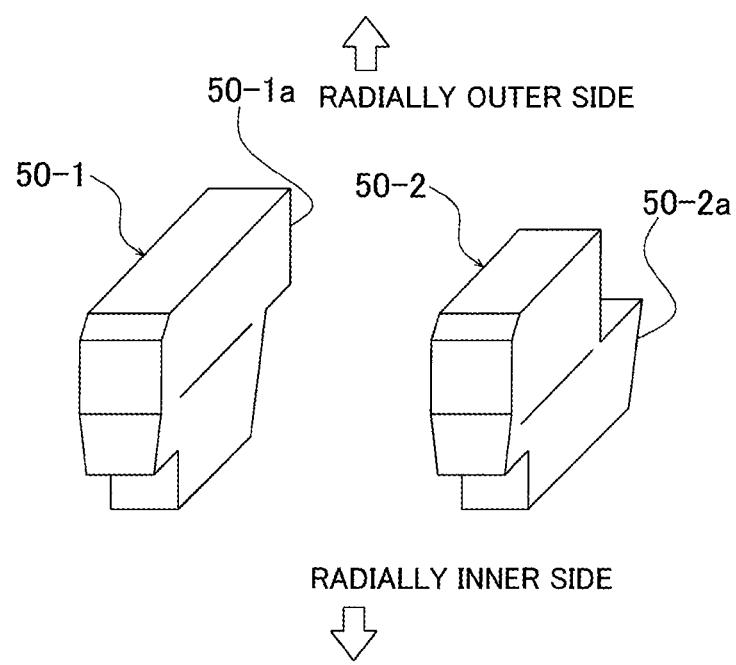
FIG. 11 is a perspective view of a first key member and a second key member.

In the dog clutch mechanism 1-3 according to the present embodiment, the key members 50 according to the first and the second embodiments are replaced with first key members 50-1 and second key members 50-2, with different shapes alternately arranged, in the recess portions 32 of the transmission gear 30. FIG. 11 is a perspective view of the first key member 50-1 and the second key member 50-2. The first key member 50-1 has an end portion, on the side closer to the transmission gear 30, serving as a projected part 50-1a with outer diameter side protruding toward the inner side of the recess portion 32 in the axial direction, and thus has an approximately up-side-down L-letter shape as viewed from the side relative to the axial direction. The second key member 50-2 has an end portion, on the side closer to the transmission gear 30, serving as a projected part 50-2a with inner diameter side protruding toward the inner side of the recess portion 32 in the axial direction, and thus has an approximately L-letter shape as viewed from the side relative to the axial direction.

The dog clutch mechanism 1-3 according to the present embodiment includes a biasing means that biases the first key member 50-1 and the second key member 50-2. The biasing means includes: a first coil spring 55-1 that biases the first key member 50-1; a first holder member 61-1 that is attached to the first key member 50-1 and holds one end of the first coil spring 55-1; a second coil spring 55-2 that biases the second key member 50-2; a second holder member 61-2 that is attached to the second key member 50-2 and holds one end of the second coil spring 55-2; and a third holder member 61-3 that is attached to a bottom part of the recess portion 32 in the axial direction and holds the other end of the first coil spring 55-1 and the other end of the second coil spring 55-2.

Figure 12:
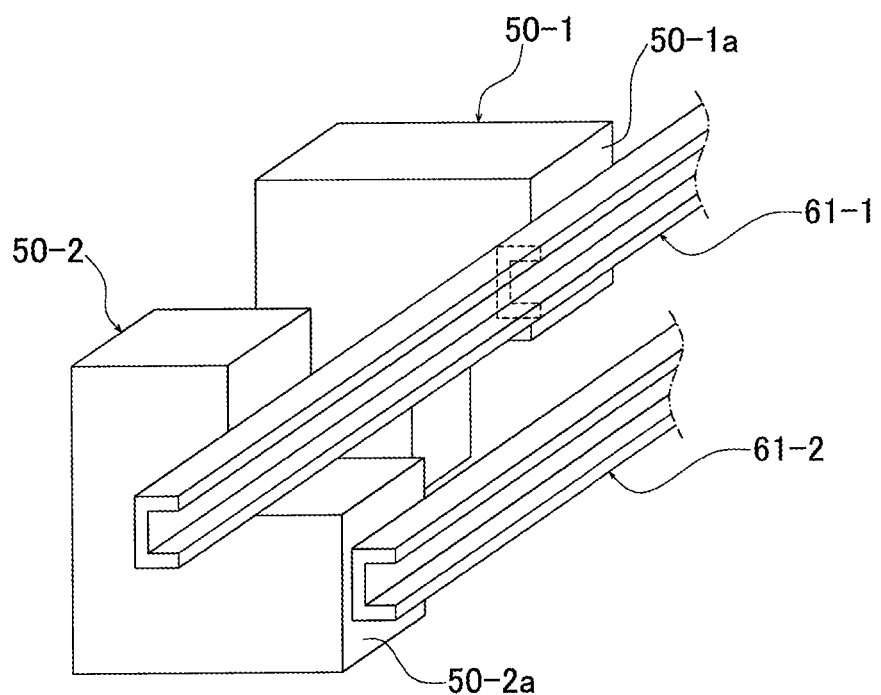
FIG. 12 is a partially enlarged perspective view of the first key member, a first holder member, the second key member, and a second holder member.
Figure 13:
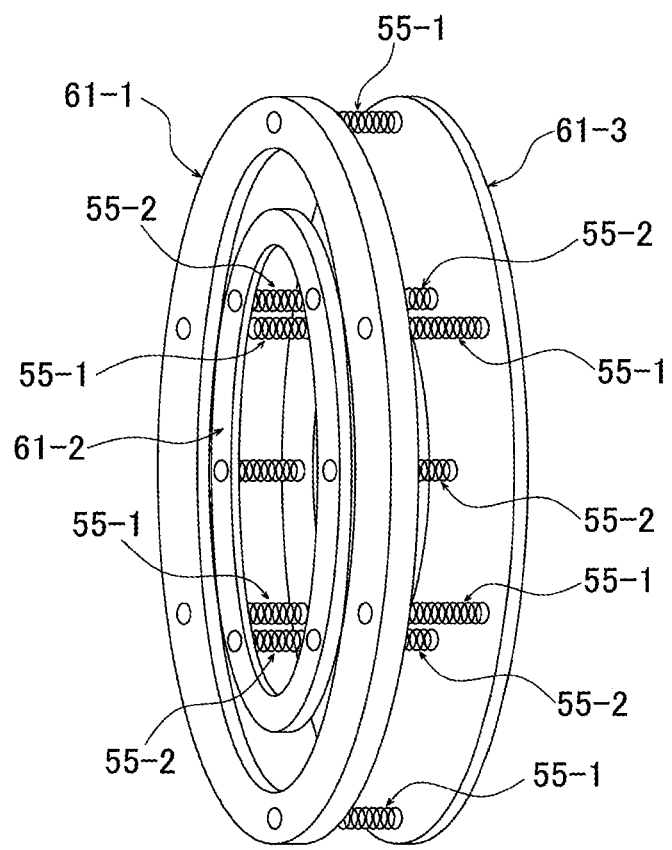
FIG. 13 is a perspective view of the first holder member, a third holder member, first coil springs attached between the first and the third holder members, the second holder member, the third holder member, and second coil springs attached between the second and the third holder members.

FIG. 12 is a schematic partially enlarged perspective view of the first key member 50-1, the first holder member 61-1, the second key member 50-2, and the second holder member 61-2. The first coil spring 55-1 in contact with the first holder member 61-1 and the second coil spring 55-2 in contact with the second holder member 61-2 are omitted from the drawings. FIG. 13 is a perspective view of the first holder member 61-1, a third holder member 61-3, the first coil springs 55-1 attached between the first and the third holder members 61-1 and 61-3, the second holder member 61-2, the third holder member 61-3, and the second coil springs 55-2 attached between the second and the third holder members 61-2 and 61-3. As illustrated in these drawings, the first holder member 61-1 has a large diameter, the second holder member 61-2 has a small diameter, and the third holder member 61-3 has a shape of a disk with an approximately the same outer diameter as the first holder member 61-1. The first holder member 61-1 is an annular member with a rectangular U-letter shaped longitudinal cross-section opened toward the side opposite to the first key member 50-1 in the axial direction. Similarly, the second holder member 61-2 is an annular member with a rectangular U-letter shaped longitudinal cross-section opened toward the side opposite to the second key member 50-2 in the axial direction A plurality of the first coil springs 55-1 are provided between the first holder member 61-1 and the third holder member 61-3. A plurality of the second coil springs 55-2 are provided between the second holder member 61-2 and the third holder member 61-3. The plurality of (six in the figure) first coil springs 55-1 are arranged at an equal angular interval in the circumference direction and each have both end portions secured to the first holder member 61-1 and the third holder member 61-3. Similarly, the plurality of (six in the figure) second coil springs 55-2 are arranged at an equal angular interval in the circumference direction and each have both end portions secured to the second holder member 61-2 and the third holder member 61-3.

As illustrated in FIG. 12, the first holder member 61-1 is attached to end surfaces (distal end surfaces in the axial direction) of the projected parts 50-1a of the first key members 50-1. The second holder member 61-2 is attached to end surfaces (distal end surfaces in the axial direction) of the projected parts 50-2a of the second key members 50-2. The first holder member 61-1 connects the plurality of first key members 50-1 that are alternating key members in the circumference direction. The first holder member 61-1 collectively biases the plurality of first key members 50-1. Similarly, the second holder member 61-2 connects the plurality of second key members 50-2 that are alternating key members in the circumference direction. The second holder member 61-2 collectively biases the plurality of second key members 50-2. The third holder member 61-3 has an outer circumference edge positioned more on the radially inner side than a radially inner end of the outer spline projection 33, and has an inner circumference edge positioned more on the radially outer side than a radially outer end of the inner spline projection 36. Thus, the third holder member 61-3 is easily attachable to the recess portion 32 of the transmission gear 30.

Figure 14:
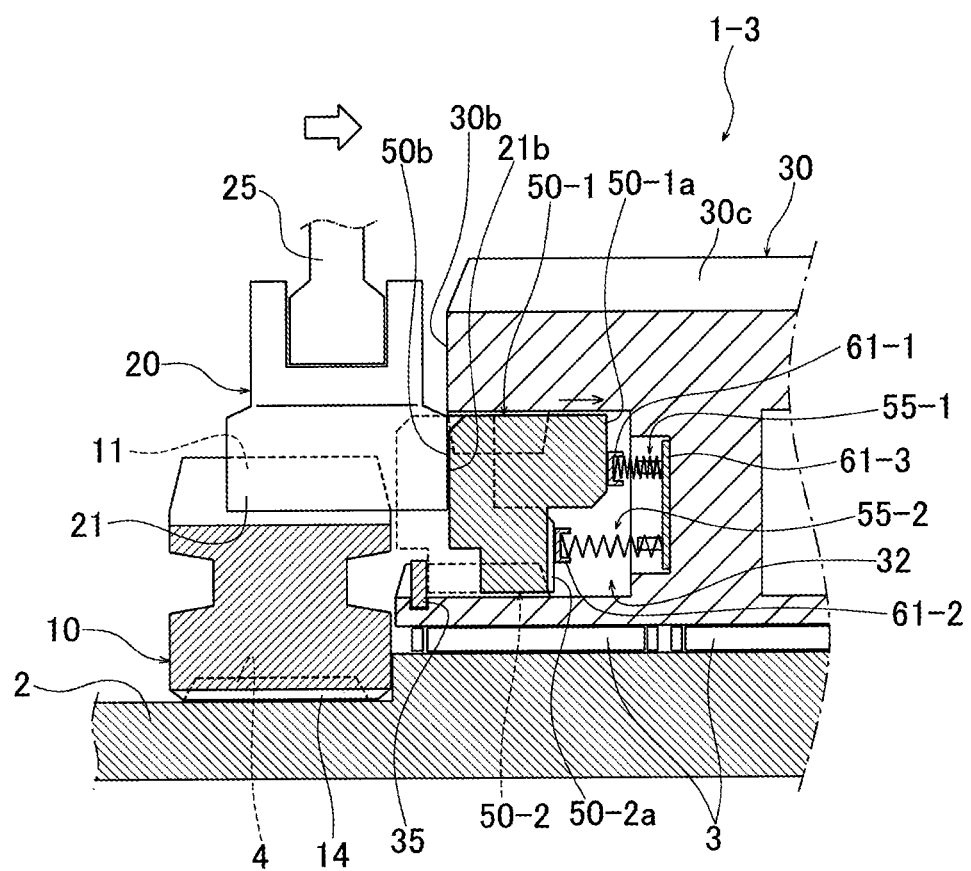
FIG. 14 is a diagram illustrating an operation of the dog clutch mechanism according to the third embodiment.

FIG. 14 is a diagram illustrating an operation in the dog clutch mechanism 1-3 according to the third embodiment. When the sleeve 20 slides toward the transmission gear 30 with the dog teeth 21b coming into contact with neither of the first key members 50-1 nor the second key members 50-2, the dog tooth 21b of the sleeve 20 engages with the transmission gear 30 side (keyway 51) with the two key members 50-1 and 50-2 disposed between the adjacent dog teeth 21b. Thus, the engaging operation in the dog clutch mechanism 1-3 is completed, with the transmission gear 30 and the sleeve 20 being relatively uneatable with each other. In this manner, the sleeve 20 smoothly engages with the transmission gear 30 when the dog teeth 21b of the sleeve 20 do not come into contact with neither of the first key members 50-1 nor the second key members 50-2.

When the sliding of the sleeve 20 toward the transmission gear 30 involves contact between the dog teeth 21b of the sleeve 20 and the key members 50-1 as illustrated in FIG. 14, the key member 50-1 that has come into contact with the dog tooth 21b retracts to the retracted position with the coil spring 55-1 compressed by the dog tooth 21b. Thus, the dog tooth 21b and the second key member 50-2 mesh with each other while being overlapped with each other. After the contact between the dog teeth 21b of the sleeve 20 and the first key member 50-1, the relative rotation between the transmission gear 30 and the hub 10 and the sleeve 20 is maintained or the components relatively rotate due to acceleration or deceleration. The relative rotations stop when a side surface (a side surface in the axial direction) of the dog tooth 21b comes into contact with a side surface of the second key member 50-2. Until the relative rotation between the transmission gear 30 and the hub 10 and the sleeve 20 thus stops, the key member 50 at the retracted position shifts in the circumference direction from the position to be in contact with the dog tooth 21b of the sleeve 20. Thus, the first key member 50-1 returns to the initial position from the retracted position, due to the biasing force of the coil spring 55.

Thus, the dog tooth 21b of the sleeve 20 is sandwiched by and engages with the keyway (not shown) between the first key member 50-1 and the second key member 50-2 adjacent to each other in the circumference direction. Thus, the engaging operation of the dog clutch mechanism 1-3 is completed with the transmission gear 30 and the sleeve 20 being unrotatable relative to each other. Although not elaborated in the drawings or not described in detail, a similar operation is performed when the dog tooth 21b of the sleeve 20 comes into contact with the second key member 50-2.

The dog clutch mechanism 1-3 according to the present embodiment includes the first holder member 61-1 integrally attached to the plurality of first key members 50-1 and the second holder member 61-2 integrally attached to the plurality of second key members 50-2. This ensures the biasing force of the coil springs 55-1 and 55-2 to be evenly applied over the plurality of key members 50-1 and 50-2. This ensures smooth and reliable operations of the key members 50-1 and 50-2 between the initial position and the retracted position. The coil springs 55-1 and 55-2 applying biasing force for the key members 50-1 and 50-2 to return to the initial position are integrated with the holder members 61-1 and 61-2. This facilitates an attempt to simplify an assembling process for the dog clutch mechanism 1-3 and the transmission including the same.

In the dog clutch mechanism 1-3 according to the present embodiment, each of the key members 50-1 and 50-2, adjacent to each other, is retractable through the same operation, regardless of which one of the key members 50-1 and 50-2 comes into contact with the dog tooth 21b of the sleeve. This ensures a smoother engaging operation of the dog clutch mechanism 1-3.

While the embodiments of the present invention have been described above, the present invention is not limited to the above embodiments, and various modifications may be made within the scope of the technical ideas described in the claims, specification, and drawings. For example, the slide member according to the embodiments of the present invention is the sleeve 20 having an annular shape provided around the rotation shaft 2. The rotation member according to the embodiments of the present invention is the transmission gear 30 having an outer circumference provided with the teeth row 30c. However, this should not be construed in a limiting sense. The slide member and the rotation member according to the present embodiment may both be gears, or any other members.

The dog clutch mechanisms 1 to 1-3 according to the embodiments described above may be applied to any one of a manual transmission with the sleeve 20 manually moved, and an automatic transmission with the sleeve 20 automatically moved by a component such as a hydraulic actuator.

The invention claimed is:

1. A dog clutch mechanism comprising:
   a rotation shaft;
   a slide member attached on the rotation shaft to be relatively unrotatable and slidable in an axial direction;
   a rotation member disposed adjacent to the slide member in the axial direction of the rotation shaft and coaxially disposed on the rotation shaft to be relatively rotatable;
   dog teeth provided on an end portion of the slide member, on a side closer to the rotation member in the axial direction;
   a plurality of spline grooves formed on the rotation member and extending in the axial direction;
   a plurality of small projections protruding inward in a radial direction of the spline grooves and extending in the axial direction;
   a plurality of key members each provided to the rotation member to be relatively moveable in the axial direction and inserted in a corresponding one of the plurality of spline grooves;
   a plurality of gaps in a circumference direction among the plurality of key members; and
   a biasing unit that biases the plurality of key members toward the slide member in the axial direction,
   wherein when sliding of the slide member toward the rotation member involves contact between the dog teeth and the key members, an engaged state is achieved so that the rotation shaft and the rotation member integrally rotate, with the key members retracted toward the rotation member to a retracted position while sliding on the small projections against biasing force of the biasing unit, and the dog teeth fit in the gaps.

2. The dog clutch mechanism according to claim 1, further comprising:
   a recess portion formed in an end surface of the rotation member, on a side closer to the slide member; and
   a plurality of spline projections each formed between corresponding adjacent ones of the plurality of spline grooves in the circumference direction of the recess portion, and extending in the axial direction,
   wherein the spline projections include a plurality of outer spline projections and a plurality of inner spline projections respectively formed on radially outer and inner sides in the recess portion, and wherein the key members are each inserted in a corresponding one of outer spline grooves, each formed between corresponding adjacent ones of the plurality of outer spline projections, and a corresponding one of inner spline grooves, each formed between corresponding adjacent ones of the plurality of inner spline projections.

3. The dog clutch mechanism according to claim 2, wherein the biasing means includes:
   a holder member that extends in the circumference direction and is attached to the plurality of key members; and
   one or a plurality of coil springs that bias the holder member.

4. The dog clutch mechanism according to claim 3, wherein the holder member includes:
   a first holder member attached to alternating ones of the key members in the circumference direction; and
   a second holder member attached to remaining ones of the key members in the circumference direction, and
   wherein the one or plurality of the coil springs include:
   a first coil spring that biases the first holder member; and
   a second coil spring that biases the second holder member.

5. The dog clutch mechanism according to claim 2, wherein the slide member is a sleeve having an annular shape provided around the rotation shaft, and
   wherein the rotation member is a gear with an outer circumference provided with a teeth row.

6. The dog clutch mechanism according to claim 1, wherein the biasing means includes:
   a holder member that extends in the circumference direction and is attached to the plurality of key members; and
   one or a plurality of coil springs that bias the holder member.

7. The dog clutch mechanism according to claim 6, wherein the holder member includes:
   a first holder member attached to alternating ones of the key members in the circumference direction; and
   a second holder member attached to remaining ones of the key members in the circumference direction, and
   wherein the one or plurality of the coil springs include:
   a first coil spring that biases the first holder member; and
   a second coil spring that biases the second holder member.

8. The dog clutch mechanism according to claim 7, wherein the slide member is a sleeve having an annular shape provided around the rotation shaft, and
   wherein the rotation member is a gear with an outer circumference provided with a teeth row.

9. The dog clutch mechanism according to claim 6, wherein the slide member is a sleeve having an annular shape provided around the rotation shaft, and
   wherein the rotation member is a gear with an outer circumference provided with a teeth row.

10. The dog clutch mechanism according to claim 1, wherein the slide member is a sleeve having an annular shape provided around the rotation shaft, and
    wherein the rotation member is a gear with an outer circumference provided with a teeth row.

* * * * *